(12) United States Patent
Yamanishi et al.

(10) Patent No.: US 11,738,921 B2
(45) Date of Patent: Aug. 29, 2023

(54) BANDING BAND

(71) Applicant: SUMITOMO CHEMICAL COMPANY, LIMITED, Tokyo (JP)

(72) Inventors: Keisuke Yamanishi, Tsukuba (JP); Taiga Sakai, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 382 days.

(21) Appl. No.: 16/978,104

(22) PCT Filed: Mar. 19, 2019

(86) PCT No.: PCT/JP2019/011573
§ 371 (c)(1),
(2) Date: Sep. 3, 2020

(87) PCT Pub. No.: WO2019/181975
PCT Pub. Date: Sep. 26, 2019

(65) Prior Publication Data
US 2021/0009325 A1 Jan. 14, 2021

(30) Foreign Application Priority Data
Mar. 23, 2018 (JP) .............................. JP2018-056506

(51) Int. Cl.
*B65D 63/10* (2006.01)
*C08G 73/10* (2006.01)
*C08G 75/23* (2006.01)

(52) U.S. Cl.
CPC ..... *B65D 63/1072* (2013.01); *C08G 73/1046* (2013.01); *C08G 75/23* (2013.01)

(58) Field of Classification Search
CPC ...................... B65D 63/1072; C08G 73/1046; C08G 75/23; C08L 71/02; C08L 79/08
See application file for complete search history.

(56) References Cited

U.S. PATENT DOCUMENTS

2004/0231110 A1\* 11/2004 Hutter, III .............. B65D 63/16
24/16 PB
2005/0050691 A1\* 3/2005 Schroder .................. F16L 3/233
24/16 PB (Continued)

FOREIGN PATENT DOCUMENTS

CN 101291993 A 10/2008
CN 101977949 A 2/2011
(Continued)

OTHER PUBLICATIONS

Chinese Office Action issued in corresponding Chinese Patent Application No. 201980019627.2, dated Mar. 9, 2022, with English translation.

(Continued)

*Primary Examiner* — David M Upchurch
(74) *Attorney, Agent, or Firm* — McDermott Will & Emery LLP (57) ABSTRACT

This banding band has a belt-like portion having a plurality of teeth on at least one surface thereof, and a securing portion positioned at one end of the belt-like portion, wherein the securing portion has a through-hole into which the other end of the belt-like portion can be inserted, and at least the belt-like portion comprises an amorphous resin having a glass transition temperature of 180° C. or higher.

8 Claims, 3 Drawing Sheets

(56) References Cited

U.S. PATENT DOCUMENTS

| | | | |
|---|---|---|---|
| 2009/0043034 A1 | 2/2009 | Ishiduka et al. | |
| 2009/0235494 A1* | 9/2009 | Browne | F16L 3/233 24/16 PB |
| 2009/0270923 A1* | 10/2009 | Tormala | A61B 17/823 606/151 |
| 2010/0212117 A1* | 8/2010 | Haase | B65D 65/466 24/16 PB |
| 2010/0274289 A1* | 10/2010 | Carls | A61B 17/842 606/263 |
| 2012/0084948 A1* | 4/2012 | Breen, IV | B65D 63/16 24/16 R |
| 2013/0205545 A1* | 8/2013 | Zantout | B65D 63/00 24/16 R |
| 2013/0344313 A1 | 12/2013 | Ordonez et al. | |
| 2015/0079376 A1 | 3/2015 | Kuhlman | |
| 2017/0328700 A1* | 11/2017 | Murphy | G01M 5/0041 |
| 2018/0135780 A1* | 5/2018 | Tschida | B65D 63/1045 |
| 2018/0236702 A1 | 8/2018 | Hirai | |
| 2018/0282037 A1* | 10/2018 | Zant | B32B 5/08 |

FOREIGN PATENT DOCUMENTS

| | | |
|---|---|---|
| CN | 104245795 A | 12/2014 |
| CN | 104520351 A | 4/2015 |
| CN | 105208893 A | 12/2015 |
| CN | 105531336 A | 4/2016 |
| JP | 10-204290 A | 8/1998 |
| JP | 2009-132896 A | 6/2009 |
| JP | 2015-517005 A | 6/2015 |
| JP | 2017-178404 A | 10/2017 |
| WO | 2009/120211 A1 | 10/2009 |
| WO | 2013/147957 A1 | 10/2013 |
| WO | 2014/055747 A1 | 4/2014 |
| WO | 2014/151246 A1 | 9/2014 |
| WO | 2016/120972 A1 | 8/2016 |

OTHER PUBLICATIONS

Chinese Office Action issued in corresponding Chinese Patent Application No. 201980019627.2, dated Jun. 2, 2022, with English translation.

Extended European Search Report issued in corresponding European Patent Application No. 19770373.9-1016, dated Nov. 18, 2021.

International Search Report issued in corresponding International Patent Application No. PCT/JP2019/011573, dated Apr. 23, 2019, with English translation.

Japanese Notice of Reasons for Refusal issued in corresponding Japanese Patent Application No. 2020-507853, dated Jul. 19, 2022, with English translation.

Chinese Office Action issued in corresponding Chinese Patent Application No. 201980019627.2, dated Sep. 3, 2021, with English translation.

Japanese Decision of Refusal issued in corresponding Japanese Patent Application No. 2020-507853, dated Dec. 6, 2022, with English translation.

* cited by examiner

BANDING BAND

CROSS REFERENCE TO RELATED APPLICATIONS

This application is the U.S. National Phase under 35 U.S.C. § 371 of International Application No. PCT/JP2019/011573, filed on Mar. 19, 2019, which claims the benefit of Japanese Application No. 2018-056506, filed on Mar. 23, 2018, the entire contents of each are hereby incorporated by reference.

TECHNICAL FIELD

The present invention relates to a banding band.

Priority is claimed on Japanese Patent Application No. 2018-56506, filed Mar. 23, 2018, the contents of which are incorporated herein by reference.

BACKGROUND ART

Banding hands are used for bundling long products such as cables and wiring cords, for tying hag openings, and for packing baggage and the like, and are used in a wide range of fields including the automotive field, the construction field, the household electrical appliances field, the electrical and electronic fields, and the daily commodities field. Examples of known materials for these banding bands include crystalline resins including polyamide resins such as nylon 66 and nylon 6 (Patent Document 1).

However, if attempts are made to use banding bands produced from polyamide resins in high-temperature environments such as the engine rooms of automobiles, then the heat resistance may sometimes be inadequate.

On the other hand, banding bands that use a polyether ether ketone (hereinafter also referred to as PEEK) having high heat resistance are known (Patent Document 2).

CITATION LIST

Patent Documents

Patent Document 1: JP H10-204290-A
Patent Document 2: WO 2016/120972

SUMMARY OF THE INVENTION

Problems to be Solved by the Invention

However, market demands are now requiring further improvements in the heat resistance of banding bands. In this description, "heat resistance" is evaluated by the tensile strength at high temperature (for example, 180° C. or higher), and the ratio (hereinafter also referred to as the retention ratio) of the tensile strength at high temperature (for example, 180° C. or higher) relative to the tensile strength at room temperature (23° C.).

The present invention has been developed in light of the above circumstances, and has an object of providing a banding band having high heat resistance that can be used even in high-temperature environments of 180° C. or higher.

Means to Solve the Problems

As a result of intensive investigation, the inventors of the present invention found that when a banding band produced using, as the formation material, a PEEK deemed to have high heat resistance was used in a high-temperature environment of 180° C. or higher, the heat resistance could not necessarily be claimed to be adequate.

As a result of using amorphous resins having high glass transition temperatures, which are not typically used in banding band applications, in order to improve the heat resistance of banding bands, the inventors of the present invention discovered, that the heat resistance of banding bands could be increased, enabling them to complete the present invention.

In order to achieve the object described above, the present invention includes the following aspects.

[1] A banding band having a belt-like portion having a plurality of teeth on at least one surface thereof, and a securing portion positioned at one end of the belt-like portion, wherein
the securing portion has a through-hole into which the other end of the belt-like portion can be inserted, and
at least the belt-like portion comprises an amorphous resin having a glass transition temperature of 180° C. or higher.

[2] The banding band according to [1], wherein the amorphous resin is at least one resin selected from the group consisting of polysulfones, polyethersulfones, polyetherimides and polyamideimides.

[3] The banding band according to [2], wherein the amorphous resin is a polyethersulfone.

[4] The banding band according to [2], wherein the amorphous resin is a polyetherimide.

[5] The banding band according to any one of [1] to [4], wherein the minimum thickness of the belt-like portion is 1.5 mm or less.

Effects of the Invention

One aspect of the present invention provides a banding band having high heat resistance.

EMBODIMENTS FOR CARRYING OUT THE INVENTION

<Banding Band>

The banding band of an embodiment of the present invention is described below based on FIG. 1 to FIG. 4.

The drawings used in the following description may sometimes be drawn with specific portions enlarged as appropriate to emphasize the features of the present invention, and the dimensional ratios and the like between the various constituent elements are not necessarily the same as the actual values. Further, for similar reasons, portions that do not represent features of the invention may sometimes be omitted.

Figure 1:
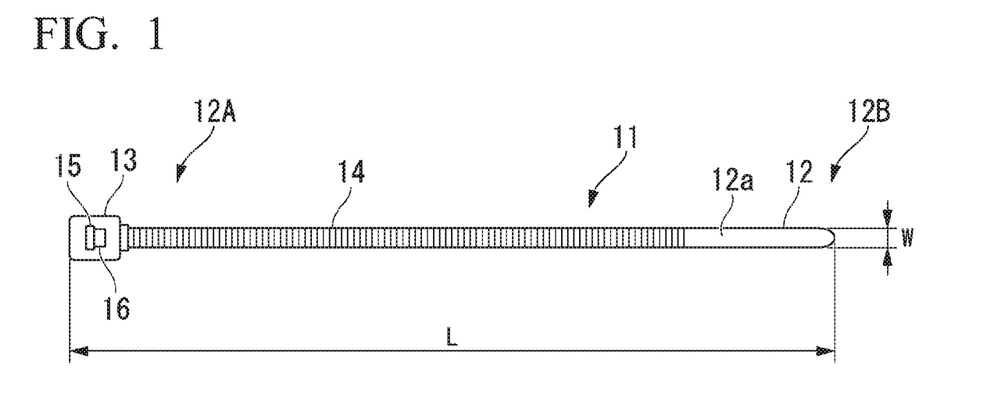
FIG. 1 is a top view illustrating one example of a banding band of an embodiment of the present invention.
Figure 2:
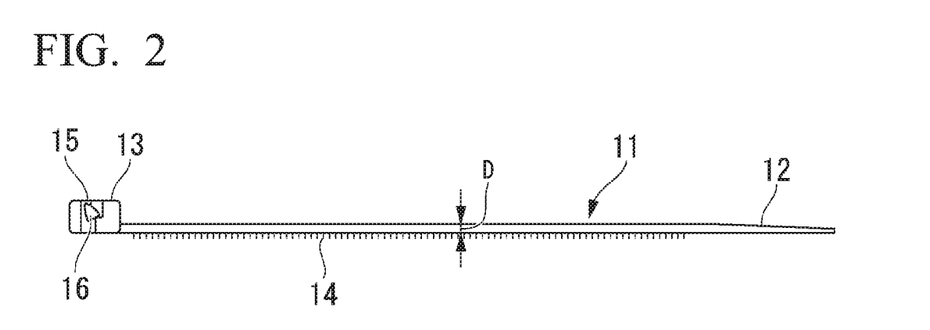
FIG. 2 is a side view of FIG. 1.
Figure 3:
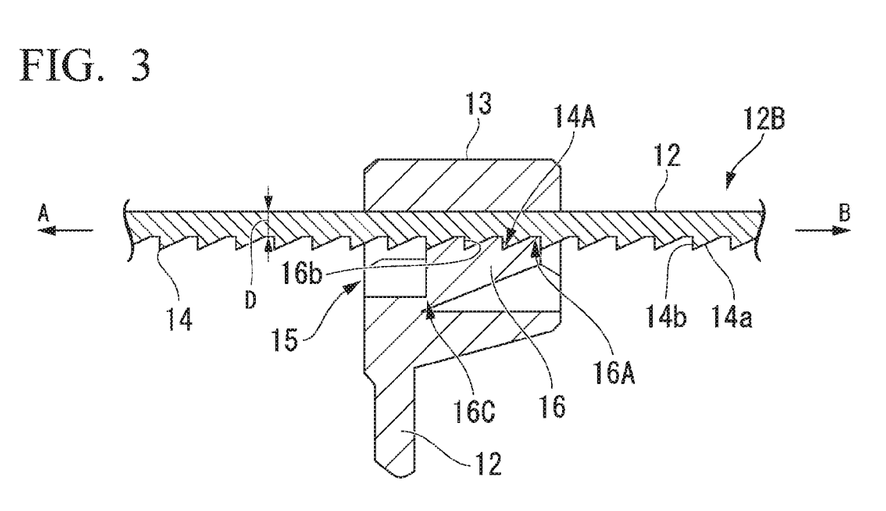
FIG. 3 is an enlarged view of a securing portion 13 with a belt-like portion 12 inserted therein.

FIG. 1 is a top view illustrating one example of a banding band of an embodiment of the present invention. FIG. 2 is a side view of FIG. 1. FIG. 3 is an enlarged view of a securing portion 13 with a belt-like portion 12 inserted therein. As illustrated in FIG. 1 and FIG. 2, the banding band 11 includes the belt-like portion 12, and the securing portion 13 provided at one end 12A of the belt-like portion 12. The banding band 11 is a so-called integrated banding band in which the belt-like portion 12 and the securing portion 13 are integrated.

In the securing portion 13, a through-hole 15 is formed into which the other end 12B of the belt-like portion 12 (the end opposite the end 12A of the belt-like portion 12 where the securing portion 13 is provided) can be inserted.

As illustrated in FIG. 3, inside the through-hole 15 in the securing portion 13 there is provided a claw 16 which, in combination with a plurality of teeth 14 described below, engages with and fastens the belt-like portion 12. The surfaces of the claw 16 that contact the belt-like portion 12 have shapes that correspond with the shapes of the plurality of teeth 14. A joint portion 16C of the claw 16 has flexibility.

The plurality of teeth 14 are formed on one surface 12a of the belt-like portion 12. The plurality of teeth 14 are arrayed along the lengthwise direction of the belt-like portion 12. The teeth 14 extend outward in the short direction of the belt-like portion 12.

The teeth 14 are formed with a serrated shape. An inclined surface 14a of each tooth 14 faces the other end 12B of the belt-like portion 12. As the belt-like portion 12 is moved along the insertion direction through the through-hole 15 starting from the other end 12B, the inclined surfaces 14a of the teeth 14 push the claw 16 downward so that linear portions 16A of the claw 16 are forced lower than apexes 14A of the teeth 14, thus allowing movement of the belt-like portion 12 along the insertion direction.

On the other hand, if an attempt is made to move the belt-like portion 12 in a direction that withdraws the belt-like portion 12 from the through-hole 15, then vertical surfaces 14b of the teeth 14 and vertical surfaces 16b of the claw 16 make contact, the teeth 14 and the claw 16 catch against one another, and withdrawal of the belt-like portion 12 is inhibited.

Figure 4:
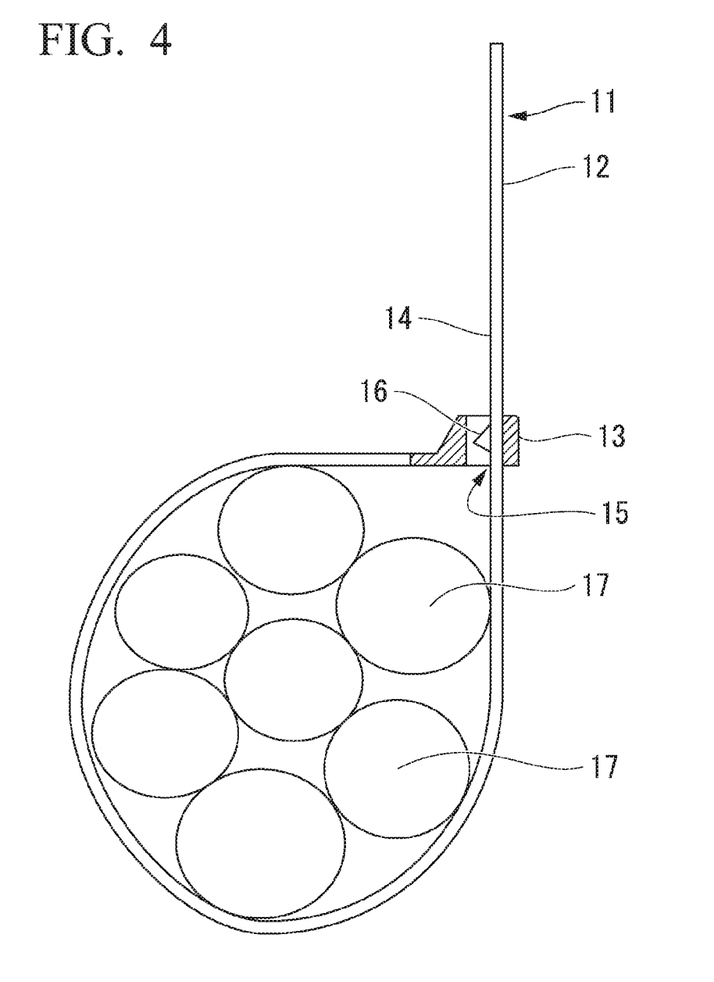
FIG. 4 is a schematic view describing an example of use of the banding band of an embodiment of the present invention.

An example of using the banding band 11 is described with reference to FIG. 4. FIG. 4 is a schematic view describing an example of using the banding band of the present embodiment. As illustrated in FIG. 4, the belt-like portion 12 of the banding band 11 is wrapped around bundling target objects 17 and then inserted into the through-hole 15 of the securing portion 13 so that the teeth 14 and the claw 16 catch against one another. By so doing, the bundling target objects 17 can be bundled without the belt-like portion 12 retracting from the position at which the teeth 14 and claw 16 have caught.

The minimum thickness (labeled D in FIG. 3) of the belt-like portion 12 is preferably greater than 0 mm but not more than 1.5 mm, and is more preferably 1.2 mm or less. Although there are no particular limitations on the lower limit for the minimum thickness of the belt-like portion 12, from the view point of the moldability, a thickness may be at least 0.5 mm, and is preferably 0.8 mm or greater.

In one aspect, the minimum thickness of the belt-like portion 12 is preferably at least 0.5 mm but not more than 1.5 mm, and is more preferably at least 0.8 mm but not more than 1.2 mm.

In this description, the "minimum thickness of the belt-like portion" means the minimum distance from the surface of the belt-like portion on the opposite side from the surface on which the plurality of teeth are formed, through to the surface on which the plurality of teeth are formed.

The minimum thickness of the belt-like portion can be measured using a dial gauge. Further, the minimum thickness of the belt-like portion can also be measured using calipers following cutting of the belt-like portion to an appropriate size.

Further, in another aspect, the ratio between the thickness of the belt-like portion 12 (namely, the minimum thickness of the belt-like portion) relative to the thickness of the securing portion 13 may be at least 1 but less than 10.

The "thickness of the securing portion" means the shortest distance from the upper surface to the lower surface of the securing portion when the banding band is placed on a horizontal surface with the surface on which the teeth are formed facing downward.

The ratio between the length of the belt-like portion 12 in the lengthwise direction (the shortest distance along the lengthwise direction of the belt-like portion 12) and the length of the belt-like portion 12 across the short direction (the shortest distance across the short direction of the belt-like portion 12) may be at least 10 but less than 100.

In one aspect, the banding band of the present embodiment preferably has a length along the lengthwise direction of 50 to 300 mm, and a length across the short direction of 2 to 10 mm.

Further, the length of the belt-like portion in the lengthwise direction is preferably from 50 to 300 mm, and the length of the belt-like portion across the short direction (hereinafter sometimes referred to as the "width") is preferably from 2 to 10 mm.

Furthermore, the length of the securing portion in the same direction as the lengthwise direction of the belt-like portion is preferably from 4 to 15 mm, the length of the securing portion in the same direction as the short direction of the belt-like portion is preferably from 4 to 15 mm, and the thickness of the securing portion is preferably from 3 to 20 mm.

The size of the through-hole is preferably from 2 to 10 mm in the same direction as the short direction of the belt-like portion (the width direction), and from 2.5 to 5 mm in the direction perpendicular to the width direction.

The claw preferably has a height of 1 to 3 mm, and a length in the same direction as the short direction of the belt-like portion (the width direction) of 1.5 to 9.5 mm.

In the specific example described above, a structure is employed in which withdrawal of the belt-like portion 12 is inhibited by the teeth 14 of the belt-like portion 12 and the claw 16 engaging with one another, but the invention is not limited to this type of structure, provided that the bundling target objects 17 can be bundled together without the belt-like portion 12 withdrawing.

Further, a structure may be used in which, in order to enable reuse of the banding band, the claw is able to be released from the teeth of the belt-like portion, enabling the belt-like portion to be moved in the withdrawal direction (the direction indicated by an arrow A in FIG. 3) at a desired timing.

Furthermore, the banding band of the present invention need not be the type of integrated banding band illustrated in FIG. 1, and may be a so-called sectional banding band in which the belt-like portion and the securing portion are separated.

Here, the states of aggregation of polymer chains can be broadly classified into two states: a state in which the polymer chains are aligned regularly, and a state in which the polymers are wound or intertwined together. The former is called a crystalline state, while the latter is called an amorphous or non-crystalline state. Resins in which a region of crystalline state exists are classified as crystalline resins, whereas resins in which no region of crystalline state exists are classified as amorphous resins.

The belt-like portion 12 comprises an amorphous resin having a glass transition temperature of 180° C. or higher as a formation material.

The securing portion 13 preferably comprises an amorphous resin having a glass transition temperature of 180° C. or higher as a formation material.

The glass transition temperature of the amorphous resin is preferably at least 180° C., more preferably at least 190° C., and even more preferably 200° C. or higher. Typically, the glass transition temperature of the amorphous resin is not higher than 300° C.

In other words, the be like portion in the banding band of the present invention comprises, as a formation material, an amorphous resin having a glass transition temperature of at least 180° C. but not more than 300° C., preferably at least 190° C. but more than 300° C., and more preferably at least 200° C. but not more than 300° C.

The amount of the amorphous resin, relative to the total mass of the belt-like portion, is preferably from 80 to 100% by mass, and is more preferably 100% by mass.

In one aspect, the belt-like portion in the handing band of the present invention may be formed solely from an amorphous resin having a glass transition temperature of at least 180° C. but not more than 300° C., preferably at least 190° C. but not more than 300° C., and more preferably at least 200° C. but not more than 300° C.

The glass transition temperature can be measured using the method prescribed in JIS-K7121.

From the viewpoint of heat resistance, the amorphous resin used in an embodiment of the present invention is preferably at least one resin selected from the group consisting of polysulfones, polyethersulfones, polyetherimides and polyamideimides, is more preferably at least one resin selected from the group consisting of polyethersulfones and polyetherimides, and is even more preferably a polyethersulfone.

Polyethersulfones that can be used favorably in the banding band of an embodiment the present invention are describe below in further detail.

Polyethersulfones

Polyethersulfones are resins having a repeating unit that typically contains a divalent aromatic group (a residue obtained by removing two hydrogen atoms bonded to the aromatic ring of an aromatic compound), a sulfonyl group ($-SO_2-$) and an oxygen atom. In terms of heat resistance and chemical resistance, the polyethersulfone preferably has a repeating unit represented by formula (1) shown below (hereinafter sometimes referred to as "repeating unit (1)"), and may also have one or more other repeating units such as a repeating unit represented by formula (2) shown below (hereinafter sometimes referred to as "repeating unit (2)") or a repeating unit represented by formula (3) shown below (hereinafter sometimes referred to as "repeating unit (3)").

$$-Ph^1-SO_2-Ph^2-O- \quad (1)$$

($Ph^1$ and $Ph^2$ each independently represent a phenylene group. Each of the hydrogen atoms in the phenylene group may be independently substituted with an alkyl group, an aryl group or a halogen atom.)

$$-Ph^3-R-Ph^4-O- \quad (2)$$

($Ph^3$ and $Ph^4$ each independently represent a phenylene group. Each of the hydrogen atoms in the phenylene group may be independently substituted with an alkyl group, an aryl group or a halogen atom. R represents an alkylidene group, an oxygen atom or a sulfur atom.)

$$-(Ph^5)_n-O- \quad (3)$$

$Ph^5$ represents a phenylene group. Each of the hydrogen atoms in the phenylene group may be independently substituted with an alkyl group, an aryl group or a halogen atom. Further, n represents an integer of 1 to 3. When n is 2 or greater, the plurality of $Ph^5$ groups may be the same or different.

The phenylene group represented by any one of $Ph^1$ to $Ph^5$ may be a p-phenylene group, an m-phenylene group or an o-phenylene group, but is preferably a p-phenylene group. Examples of the alkyl group that may substitute a hydrogen atom in the phenylene group include alkyl groups of 1 to 10 carbon atoms, and for example, a methyl group, ethyl group, n-propyl group, isopropyl group, n-butyl group, isobutyl group, s-butyl group, t-butyl group, n-hexyl group, 2-ethylhexyl group, n-octyl group or n-decyl group is preferable. Examples of the aryl group that may substitute a hydrogen atom in the phenylene group include aryl groups of 6 to 20 carbon atoms, and for example, a phenyl group, o-tolyl group, m-tolyl group, p-tolyl group, 1-naphthyl group or 2-naphthyl group is preferable. In those cases where one or ore hydrogen atoms in the phenylene group are substituted with these groups, the number of these substituent groups per phenylene group is, independently, typically 2 or fewer, and is preferably 1.

Examples of the alkylidene group for R include alkylidene groups of 1 to 5 carbon atoms, and for example, a methylene group, ethylidene group, isopropylidene group or 1-butylidene group is preferable.

The polyethersulfone contains the repeating unit (1) in an amount which, relative to the total of all the repeating units (namely, relative to the total amount of all the repeating units that constitute the polyethersulfone), is preferably at least 50 mol % but not more than 100 mol %, and more preferably at least 80 mol % but not more than 100 mol %, and it is even more preferable that the polyethersulfone has substantially only the repeating unit (1) (namely, 95 to 100 mol %) as a repeating unit. The polyethersulfone may have two or more types of each of the repeating units (1) to (3).

The polyethersulfone can be produced by polycondensation of dihalogenosulfone compounds and dihydroxy compounds that correspond with the repeating units that constitute the polyethersulfone.

For example, a resin having the repeating unit (1) can be produced by using a compound represented by formula (4) shown below (hereinafter sometimes referred to as "compound (4)") as a dihalogenosulfone compound, and using a compound represented by formula (5) shown below (hereinafter sometimes referred to as "compound (5)") as a dihydroxy compound.

Further, a resin having the repeating unit (1) and the repeating unit (2) can be produced by using the compound (4) as a dihalogenosulfone compound, and using a compound represented by formula (6) shown below (hereinafter sometimes referred to as "compound (6)") as a dihydroxy compound.

Furthermore, a resin having the repeating unit (1) and the repeating unit (3) can be produced by using the compound (4) as a dihalogenosulfone compound, and using a compound represented by formula (7) shown below (hereinafter sometimes referred to as "compound (7)") as a dihydroxy compound.

$$X^1-Ph^1-SO_2-Ph^2-X^2 \quad (4)$$

$X^1$ and $X^2$ each independently represent a halogen atom. $Ph^1$ and $Ph^2$ are as defined above.

$$HO\text{—}Ph^1\text{-}SO_2\text{-}Ph^2\text{—}OH \quad (5)$$

$Ph^1$ and $Ph^2$ are as defined above.

$$HO\text{—}Ph^3\text{—}R\text{—}Ph^4\text{—}OH \quad (6)$$

$Ph^3$, $Ph^4$ and R are as defined above.

$$HO\text{—}(Ph^5)_n\text{—}OH \quad (7)$$

$Ph^5$ and n are as define above.

The polycondensation mentioned above is preferably conducted in a solvent using an alkali metal salt of carbonic acid. The alkali metal salt of carbonic acid may be an alkali carbonate which is a normal salt, an alkali bicarbonate (also called an alkali hydrogen carbonate) which is an acidic salt, or a mixture of the two, wherein sodium carbonate and potassium carbonate and the like can be used favorably as the alkali carbonate, and sodium bicarbonate and potassium bicarbonate and the like can be used favorably as the alkali bicarbonate. Examples of solvents that may be used favorably include organic polar solvents such as dimethyl sulfoxide, 1-ethyl-2-pyrrolidone, sulfolane (also called 1,1-dioxothiolane), 1,3-dimethyl-2-imidazolidinone, 1,3-diethyl-2-imidazolidinone, dimethyl sulfone, diethyl sulfone, diisopropyl sulfone and diphenyl sulfone.

The polyethersulfone has a reduced viscosity that is, for example, at least 0.3 dL/g, preferably at least 0.33 dL/g but not more than 0.45 dL/g, and more preferably at least 0.36 dL/g but not more than 0.41 dL/g. Provided the reduced viscosity is at least 0.3 dL/g, the heat resistance and strength and rigidity can be more easily increased. On the other hand, provided the reduced viscosity not more than 0.45 dL/g, the molding temperature and melt viscosity do not become overly high, and a banding and of the prescribed shape can be molded easily.

The reduced viscosity can be determined using the method described below in the section entitled "Measurement of Reduced Viscosity".

In the polycondensation, if it is assumed that no side reactions occur, then the closer the molar ratio between the dihalogenosulfone compound and the dihydroxy compound is to 1:1, the larger the amount used of the alkali metal salt of carbonic acid, the higher the polycondensation temperature, and the longer the polycondensation time, the higher the degree of polymerization of the obtained polyethersulfone tends to become, and the higher the reduced viscosity tends to become, but in actuality, by-products such as alkali hydroxides cause side reactions such as substitution reactions of a halogeno group with a hydroxyl group and depolymerization reactions and the like, and these side reactions tend to reduce the degree of polymerization of the obtained polyethersulfone and lower the reduced viscosity, and therefore the molar ratio between the dihalogenosulfone compound and the dihydroxy compound, the amount used of the alkali metal salt of carbonic acid, the polycondensation temperature and the polycondensation time are preferably adjusted with due consideration of the degree of the above side reactions, so as to obtain a polyethersulfone having the desired reduction viscosity.

The polyethersulfone may be used in the form of a polyethersulfone composition by adding at least one other component such as a filler, additive or resin other than a polyethersulfone to the polyethersulfone.

In one aspect, the amount of the polyethersulfone in the polyethersulfone composition, relative to the total mass of the polyethersulfone composition, is preferably within a range from 80 to 100% by mass.

Further, in another aspect, the belt-like portion in the present invention may be obtained using, as a formation material, a composition comprising an amorphous resin (for example, a polyethersulfone or a polyetherimide) having a glass transition temperature of 180° C. or higher, and if desired, also comprising at least one component selected from the group consisting of fillers, additives, and resins other than amorphous resin.

The filler may be a fibrous filler, a plate-like filler, or filler other than a fibrous filler or plate-like filler such as a spherical filler or other granular filler. Further, the filler may be an inorganic filler or an organic filler. Examples of fibrous inorganic fillers include glass fibers; carbon fibers such as PAN-based carbon fiber and pitch-based carbon fiber, ceramic fibers such as silica fiber, alumina fiber and silica-alumina fiber; and metal fibers such as stainless steel fiber. Further examples include whiskers such as potassium titanate whiskers, barium titanate whiskers, wollastonite whiskers, aluminum borate whiskers, silicon nitride whiskers, and silicon carbide whiskers. Examples of fibrous organic fillers include polyester fibers and aramid fibers. Examples of plate-like inorganic fillers include talc, mica, graphite, wollastonite, glass flakes, barium sulfate and calcium carbonate. The mica may be muscovite, phlogopite, fluorphlogopite or tetrasilicic mica. Examples of granular inorganic fillers include silica, alumina, titanium oxide, glass heads, glass balloons, boron nitride, silicon carbide and calcium carbonate. The blend amount of the filler is, for example, from 0 to 20 parts by mass per 100 parts by mass of the polyethersulfone.

Examples of additives include release agents, antioxidants, thermal stabilizers, ultraviolet absorbers, antistatic agents, surfactants, flame retardants and colorants.

Examples of the release agents include montanoic acid, salts and esters thereof and half esters thereof with polyhydric alcohols, as well as stearyl alcohol, stearamide and polyethylene wax, and fatty acid esters of pentaerythritol are preferable.

The blend amount of additives is, for example, from 0 to 5 parts by mass per 100 parts by mass of the polyethersulfone.

Examples of resins other than the polyethersulfone include thermoplastic resins other than polyethersulfone such as polypropylenes, polyamides, polyesters, polyphenylene sulfides, polyetherketones, polycarbonates, polyphenylene ethers and polyetherimides; and thermosetting resins such as phenol resins, epoxy resins, polyimide resins and cyanate resins. The blend amount of resins other than the polyethersulfone is, for example, from 0 to 20 parts by mass per 100 parts by mass of the polyethersulfone.

The polyethersulfone composition is preferably prepared by melt kneading of the polyethersulfone and any other desired components using an extruder, and then extrusion of the mixture in pellet form. An extruder having a cylinder, at least one screw disposed inside the cylinder, and at least one supply port provided in the cylinder can be used favorably, and an extruder that also has at least one vent provided in the cylinder can he used particularly favorably.

By molding the polyethersulfone or the composition thereof, the banding band described above can be obtained. Examples of the molding method include injection molding methods and extrusion molding methods.

The banding band having the configuration described above has high heat resistance. In this description, "heat resistance" is evaluated by the tensile strength at high temperature (for example, 180° C.), and the ratio of the tensile strength at high temperature (for example, 180° C.) relative to the tensile strength at room temperature (23° C.). The structure of the banding band is not limited to those illustrated in FIG. 1 and FIG. 2, and it can be stated that similarly high heat resistance can be achieved for conventional banding band structures.

The banding band of an embodiment of the present invention has high heat resistance, and can therefore be used favorably in applications that require use in high-temperature environments. Examples of these types of applications include applications in the automotive field, the electrical and electronic fields, the construction field, and the outdoor daily commodities field. Among these, the banding band of an embodiment of the present invention can he used particularly favorably in the automotive field and the electrical and electronic fields. The location in which the banding band 11 of an embodiment of the present invention is used is, for example, preferably inside the engine room of an automobile. When used in a high-temperature environment, for example at 180° C., the tensile strength is preferably at least 140 N, and more preferably 150 N or higher. Further, the retention ratio preferably exceeds 50%, and is more preferably 55% or higher.

In one aspect, the banding band of one embodiment of the present invention has a belt-like portion having a plurality of teeth on at least one surface thereof, and a securing portion positioned at one end of the belt-like portion, wherein the securing portion has a through-hole into which the other end of the belt-like portion can be inserted, a claw is provided inside the through-hole, The minimum thickness of the belt-like portion is at least 0.5 mm but not more than 1.5 mm, and preferably at least 0.8 mm but not more than 1.2 mm, and at least the belt-like portion is formed from a polyethersulfone or a polyetherimide.

Furthermore, the banding band described above may have a tensile strength at 180° C. of at least 140 N, and preferably 150N or higher, and a retention ratio, which is the ratio of the tensile strength at a temperature of at least 180° C. but not more than 200° C. relative to the tensile strength at 23° C., that exceeds 50%, and is preferably 55% or higher.

Moreover, the banding band described above may have a length across the short direction of the belt-like portion of 2 to 10 mm.

EXAMPLES

The present invention is described below using examples, but the present invention is not limited by these examples.

Measurement of Glass Transition Temperature

Using a differential scanning calorimeter (DSC-50 manufactured by Shimadzu Corporation), the glass transition temperature of the resin used was calculated using the method prescribed in JIS-K7121. Specifically, a sample of about 10 mg was weighed, and following raising of the temperature to 400° C. at a rate of temperature increase of 10° C./minute, the temperature was cooled to 50° C., and then once again raised to 400° C. at a rate of temperature increase of 10° C./minute. Using the DSC chart obtained during the second temperature raising process, the glass transition temperature was calculated using the method prescribed in J1S-K7121.

[Measurement of Reduced Viscosity]

About 1 g of the resin used was dissolved in N,N-dimethylformamide, the volume of the solution was made up to 1 dL, and the viscosity ($\eta$) of this solution was measured at 25° C. using an Ostwald viscosity tube. Further, the viscosity ($\eta_o$) of the N,N-dimethylformamide solvent was also measured at 2520 C. using an Ostwald viscosity tube. From the viscosity ($\eta$) of the above solution and the viscosity ($\eta_o$) of the above solvent, the specific viscosity (($\eta-\eta_o$)/$\eta_o$) was determined, and by dividing this specific viscosity by the concentration (about 1 g/dL) of the above solution, the reduced viscosity (dL/d) of the resin was determined.

Minimum Thickness of Belt-Like Portion

The minimum thickness of the belt-like portion was measured using a dial gauge.

Tensile Strength of Banding Band

Three of each of the banding bands were wrapped around the outer periphery of a circular cylinder of diameter 13 mm, and using an Autograph, the bands were pulled at a tension rate of 10 mm/minute using a grip distance of 50 mm, and the tensile strength under an atmosphere at a humidity of 50% was measured, with the average value across the three bands being employed. The measurements were conducted at measurement temperatures of room temperature (23° C.) and 180° C.

Production of Polyethersulfone Pellets

A polyethersulfone SUMIKAEXCEL 4100P (glass transition temperature: 225° C., reduced viscosity: 0.41 dL/lg) manufactured by Sumitomo Chemical Co., Ltd, was subjected to melt kneading using a twin screw extruder PCM-30 manufactured by Ikegai Corporation, thus obtaining pellets. The melt kneading conditions included a cylinder temperature setting of 340° for the twin screw extruder and a screw revolution speed of 150 rpm.

Another resin used in the examples is as follows.

Polyetherimide (hereinafter also referred to as PH): Ultem AUT200 (manufactured by SABIC), glass transition temperature: 217° C.

Resins used in the comparative examples are shown below.

Nylon 66 (hereinafter also referred to as PA66): LEONA 1402S (manufactured by Asahi Kasei Corporation), glass transition temperature: 50° C.

PEEK: 151G (manufactured by Victrex Japan Inc.), glass transition temperature: 143° C.

Reference Examples 1 to 8

As banding hand modeling tests, the polyethersulfone (hereinafter also referred to as PES) and PEEK were used to produce ASTM No. 4 dumbbell test pieces (thickness: 2.5 mm) and JIS K7113 No. 1(½) dumbbell test pieces (thickness: ⅙ mm, 1.2 mm, 0.8 mm) using an injection molding machine (PNX-5A, manufactured by Nissei Plastic Industrial Co., Ltd.). For each of these test pieces, the retention ratio of the tensile strength at 180° C. relative to the tensile strength at room temperature (23° C.) was determined. In these examples, the thickness of the dumbbell test piece (the shortest distance across the thickness direction) was deemed the "minimum thickness".

Example 1, Example 2, Comparative Example 1 and Comparative Example 2

Using the PES, PEI, PA66 and PEEK, an injection molding machine (PNX-5A, manufactured by Nissei Plastic Industrial Co., Ltd.) was used to produce banding Lands illustrated in FIG. 1 and FIG. 2, having a length L=110 mm, a width W=4.8 mm, and a minimum thickness D=0.8 mm. For each of these banding bands, the tensile strength at high temperature (180° C.) and the retention ratio represented by the ratio of the tensile strength at high temperature (180° C.) relative to the tensile strength at room temperature (23° C.) were determined.

In Table 1, each of the tensile strength values is shown relative to a value of 100 for the tensile strength of the banding band of Example 1 at room temperature. Further, in Table 2, the tensile strength value relative to a value of 100 for the tensile strength of the banding band of Example 1 at room temperature (23° C.) and the actual measured value of the tensile strength at 180° C. (recorded in parentheses) are shown.

TABLE 1

| | Resin | Minimum thickness (mm) | Tensile strength test Room temperature | 180° C. | Retention ratio (%) |
|---|---|---|---|---|---|
| Reference Example 1 | PES | 2.5 | 90 | 40 | 44 |
| Reference Example 2 | PEEK | 2.5 | 96 | 41 | 43 |
| Reference Example 3 | PES | 1.6 | 90 | 41 | 45 |
| Reference Example 4 | PEEK | 1.6 | 94 | 46 | 50 |
| Reference Example 5 | PES | 1.2 | 89 | 43 | 48 |
| Reference Example 6 | PEEK | 1.2 | 93 | 42 | 45 |
| Reference Example 7 | PES | 0.8 | 89 | 42 | 47 |
| Reference Example 8 | PEEK | 0.8 | 101 | 43 | 43 |

TABLE 2

| | Resin | Minimum thickness (mm) | Tensile strength test (actual measured value [N]) Room temperature | 180° C. | Retention ratio (%) |
|---|---|---|---|---|---|
| Example 1 | PES | 0.8 | 100 (269 N) | 59 (160 N) | 59 |
| Example 2 | PEI | 0.8 | 131 (353 N) | 54 (145 N) | 41 |
| Comparative Example 1 | PA66 | 0.8 | 76 (204 N) | 34 (91 N) | 45 |
| Comparative Example 2 | PEEK | 0.8 | 124 (334 N) | 50 (135 N) | 40 |

As shown in Table 1, when the test pieces having a minimum thickness of 2.5 mm were compared, the test piece of Reference Example 1 that used PES and the test piece of Reference Example 2 that used PEEK had similar retention ratios. Further, when the test pieces having a minimum thickness of 1.6 mm were compared, the test piece of Reference Example 3 that used PES had a lower retention ratio than the test piece of Reference Example 4 that used PEEK.

In contrast, when the test pieces having a minimum thickness of 1.2 mm were compared, the test piece of Reference Example 5 that used PES had a higher retention ratio than the test piece of Reference Example 6 that used PEEK. Similarly, when the test pieces having a minimum thickness of 0.8 mm were compared, the test piece of Reference Example 7 that used PES had a higher retention ratio than the test piece of Reference Example 8 that used PEEK.

At the thickness values of test pieces typically used in the measurement of the tensile strength of molded articles, the tensile strength and retention ratio of a test piece that uses PES are similar to or lower than the tensile strength and retention ratio of a test piece that uses PEEK.

However, when a dumbbell test piece was used that has a thickness less than the thickness of test pieces typically used in measurement, surprisingly, it was found that the retention ratio of a test piece that uses PES was higher than the retention ratio of a test piece that uses PEEK.

As shown in Table 2, compared with the banding bands of Comparative Example 1 and Comparative Example 2 that did not apply an aspect of the present invention, the banding bands of Example 1 and Example 2 that applied an aspect of the present invention exhibited both a higher tensile strength at high temperature (180° C.) and a higher retention ratio.

Based on these results, it can be stated that the banding bands of Example 1 and Example 2 that applied an aspect of the present invention exhibit high heat resistance.

The above results confirmed that the present invention is useful.

INDUSTRIAL APPLICABILITY

The present invention can provide a banding band having high heat resistance, and is therefore extremely useful industrially.

EXPLANATION OF REFERENCES

11: Banding band
12: Belt-like portion
12A: One end
12a: Surface
12B: Other end
13: Securing portion
14: Tooth
14a: Inclined surface
14b: Vertical surface
15: Through-hole
16: Claw

The invention claimed is:

1. A banding band having a belt-like portion having a plurality of teeth on at least one surface thereof, and a securing portion positioned at one end of the belt-like portion, wherein
  the securing portion has a through-hole into which another end of the belt-like portion can be inserted,
  at least the belt-like portion comprises an amorphous resin having a glass transition temperature of 180° C. or higher, and
  wherein the banding band has a tensile strength at 180° C. of at least 140 N or higher.

2. The banding band according to claim 1, wherein the amorphous resin is at least one resin selected from the group consisting of polysulfones, polyethersulfones, polyetherimides and polyamideimides.

3. The banding band according to claim 2, wherein the amorphous resin is a polyethersulfone.

4. The banding band according to claim 2, wherein the amorphous resin is a polyetherimide.

5. The banding band according to claim 1, wherein a minimum thickness of the belt-like portion is 1.5 mm or less.

6. The banding band according to claim 2, wherein a minimum thickness of the belt-like portion is 1.5 mm or less.

7. The banding band according to claim 3, wherein a minimum thickness of the belt-like portion is 1.5 mm or less.

8. The banding band according to claim 4, wherein a minimum thickness of the belt-like portion is 1.5 mm or less.

\* \* \* \* \*